INVENTOR
PIERRE R. J. MONDON
BY Kurt Kelman
HIS AGENT

INVENTOR
PIERRE R. J. MONDON
BY Kurt Kelman
HIS AGENT

INVENTOR
PIERRE R. J. MONDON
BY Kurt Kelman
HIS AGENT

United States Patent Office 3,528,069
Patented Sept. 8, 1970

3,528,069

RADAR APPARATUS INCORPORATING A MEMORY DEVICE IN THE FORM OF A FERRITE MATRIX

Pierre R. J. Mondon, Paris, France, assignor to Société Nouvelle d'Electronique et de la Radio-Industrie, Paris, France, a corporation of France

Continuation of abandoned application Ser. No. 800,598, Mar. 19, 1959. This application Mar. 16, 1964, Ser. No. 353,020
Claims priority, application France, Apr. 4, 1958, 762,336; July 24, 1958, 771,019
Int. Cl. G01s *7/24, 9/02*
U.S. Cl. 343—5 9 Claims

Figure 1:
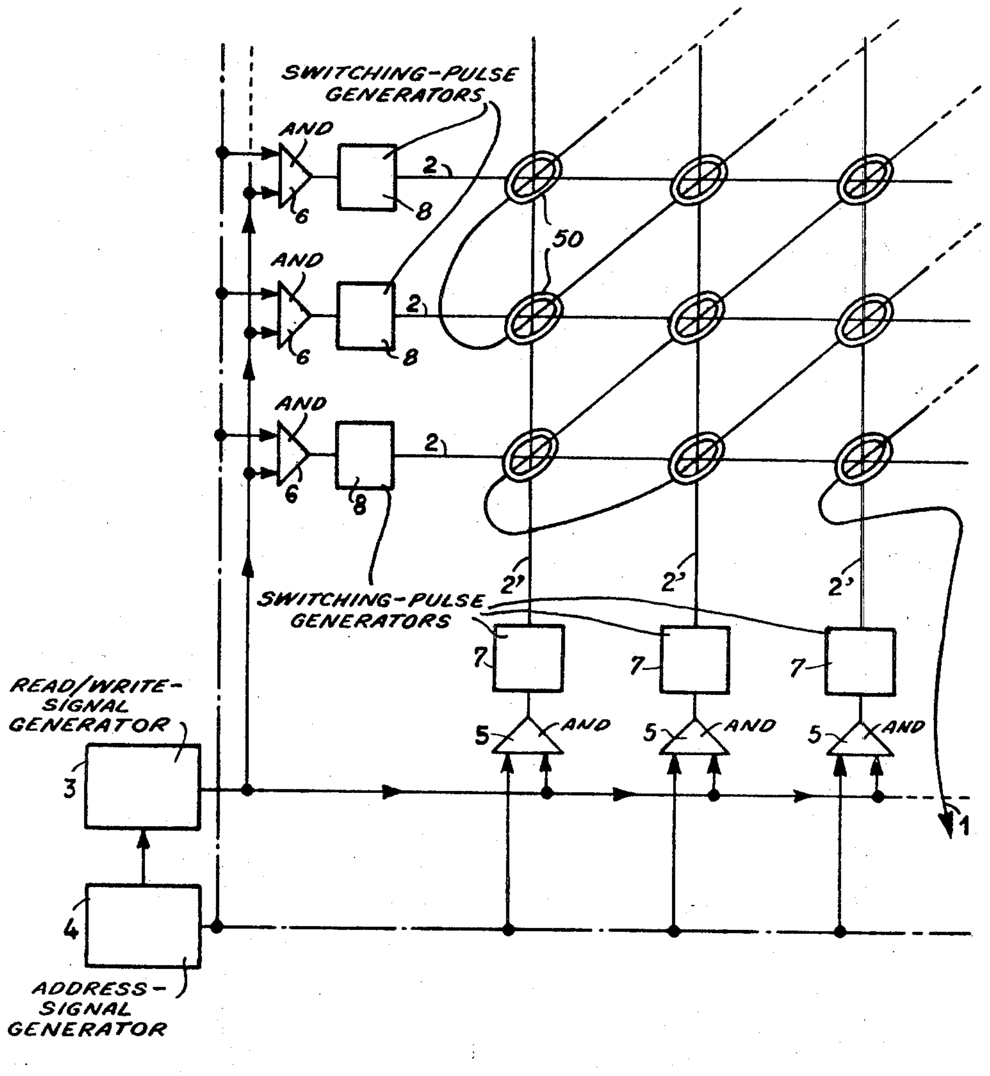

This application is a continuation of my application Ser. No. 800,598, filed Mar. 19, 1959, and now abandoned.

The present invention relates to a radar system in which information on the position of a target is delivered, in the form of signal pulses, to a memory device comprising a matrix of pulse-storing units.

A pulse-storing unit particularly suitable for such systems comprises a ferromagnetic (e.g., ferrite) core whose state of magnetization is altered by the concurrent application of a switching pulse and a writing pulse. The switching pulse consists generally of two successive current impulses of opposite polarity of which the first, when accompanied by a suitably polarized reading pulse, gives rise to an output pulse if the state of magnetization of the core had previously been altered by an inscribed writing pulse, the reading pulse also serving to reset the core to its normal state so as to erase the pulse previously stored thereon; the second current impulse conditions the core for the inscription of a new writing pulse or for the immediate reregistration of a pulse heretofore stored thereon.

Units of this description are conveniently arranged in a planar array of orthogonal rows and files whereby, upon the concurrent application of switching pulses to all the cores of a selected row and to all the cores of a selected file, only the core located at the junction of said row and file is conditioned to receive a reading and/or writing pulse. Thus, the simultaneous application of reading pulses to all the cores of the array will produce an output pulse, adapted to be read out on a single conductor common to all the cores, only if the one core concurrently selected by the switching pulses is in its altered state of magnetization.

An object of this invention is to utilize a matrix of such memory units in the evaluation of radar signals, particularly in a system in which the information content of these signals is to be reproduced on a display indicator.

Another object of the invention is to provide means in a radar system for delivering information on the position of a target to a utilization device, such as the aforementioned display indicator, at a time and/or rate different from that at which pulses carrying such information are received from a radar antenna.

In accordance with the instant invention there is provided a memory device with several arrays of pulse-storing units, specifically a plurality of planar arrays of ferromagnetic cores of the aforedescribed type wherein each core has a nearly rectangular hysteresis loop, in combination with a timing circuit adapted to scan all of said arrays simultaneously by concurrent application of switching and reading pulses to homologous cores of the several arrays and sequentially testing the cores of each array in the course of a scanning cycle; the individual arrays are provided with output connections including means for applying the read-out pulses from homologous units successively to a utilization circuit.

In general, the switching of each core (i.e., its restoration to a normal state of magnetization if a pulse had been previously inscribed thereon) may result in complete erasure of the pulse from the memory or be immediately followed by reregistration of such pulse on the same or some other core (e.g., for the purpose of determining the average echo to find the most probable target position), depending on the type of system employed.

More specifically, in one embodiment of the invention, the arrays are sequentially connected to the utilization circuit in successive scanning cycles and are provided with feedback circuits by means of which, during the scanning cycles in which they are not so connected, the pulses read out in the consecutive test intervals of each cycle are reregistered on their original cores so as to be available when the array is again connected to the indicator. When this occurs, the feedback connections are blocked so that all the units of the array are again free to receive writing pulses representative of quantized information fed to the matrix by an associated radar antenna. Such an arrangement is particularly useful in a system designed to produce a two-dimensional display of a target position on the basis of two sets of values derived from the incoming pulses, one set of values related to the range of the target while the other is indicative of a further coordinate such as, for example, the height of the target. The range values can be stored, in discrete increments or quanta, on respective cores of any array whereas the values of the other coordinate (e.g., height), similarly quantized, are represented by the selection of the particular array in which the range-storing core is situated.

The successive delivery of output pulses from several concurrently tested pulse-storage units of different arrays can also be utilized with advantage in a system in which the incoming radar pulses have a maximum recurrence rate which is greater than the scanning speed of the switching and reading circuits associated with the memory device. In this case, successive pulses occurring in a single test interval can be distributed to homologous cores of different arrays, in a predetermined order, to be read out sequentially by virtue of the presence of staggered delay means in the connections leading from the individual arrays to their common output circuit.

Figure 2:
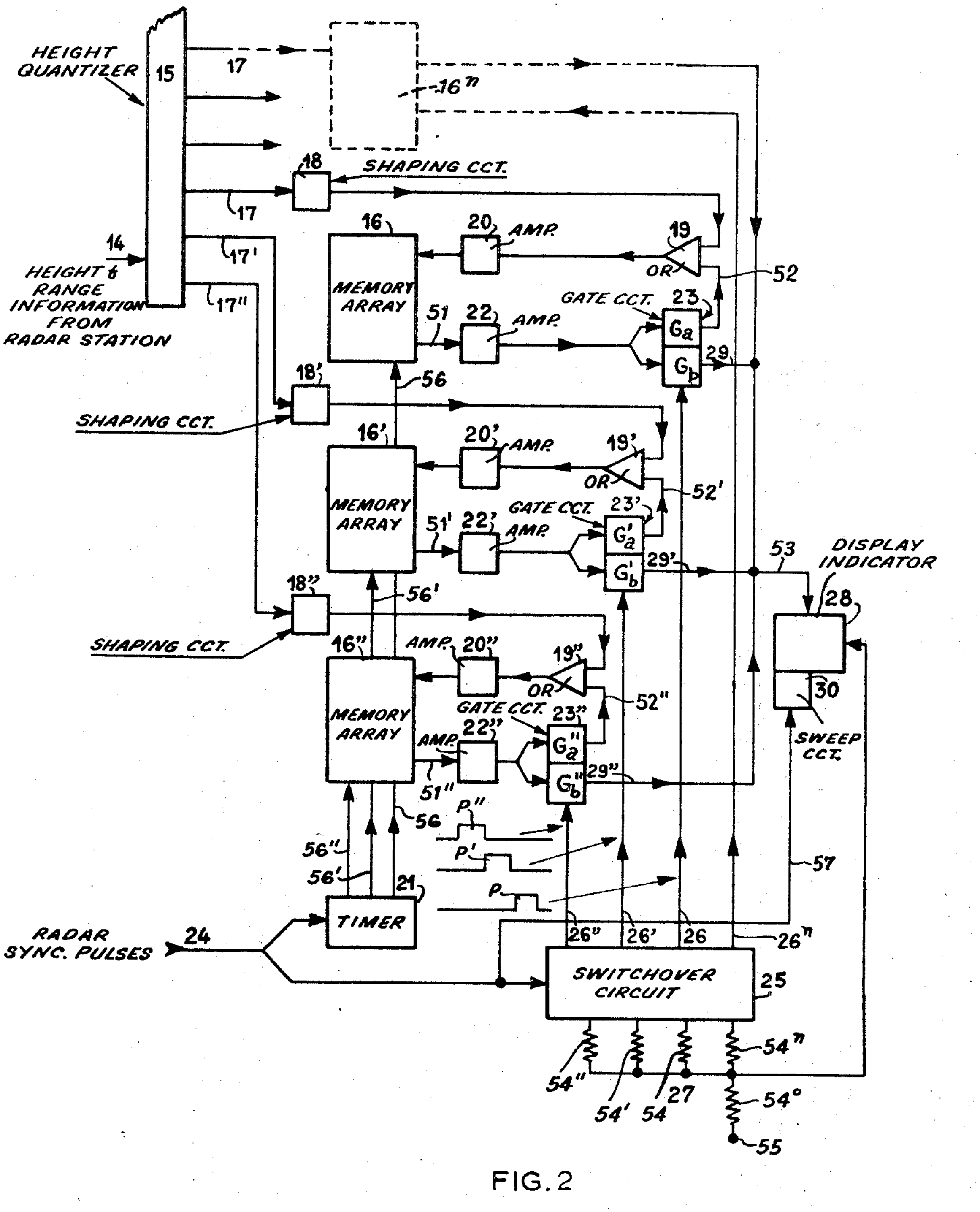
Figure 3:
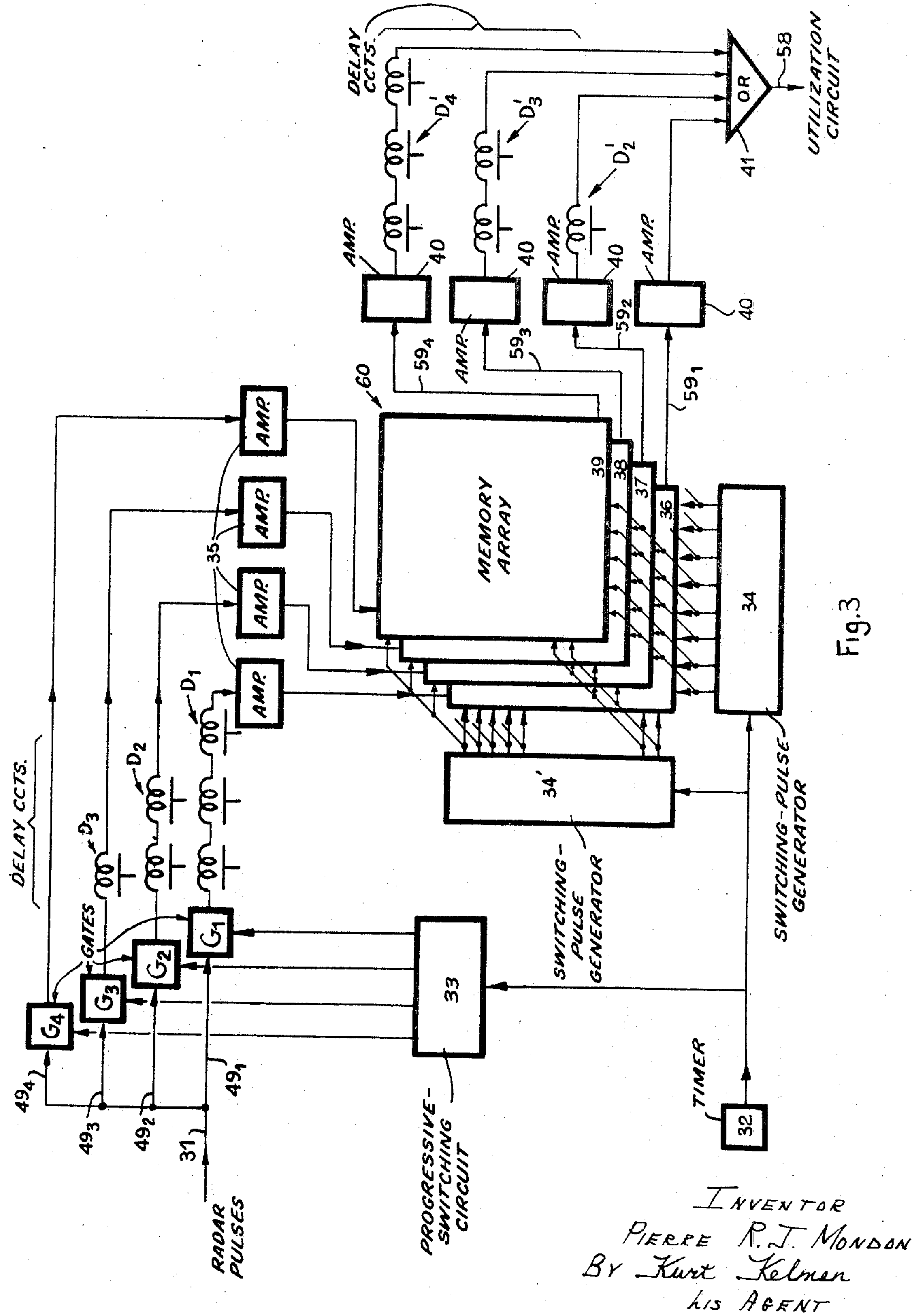

These and other objects and features of the invention will become more readily apparent from the following detailed description of certain embodiments, reference being made to the accompanying drawing in which:

FIG. 1 is a circuit diagram representing part of an orthogonal array of ferromagnetic cores and associated elements;

FIG. 2 is a circuit diagram of a system incorporating several arrays of the type shown in FIG. 1 as part of a memory device for the storage of quantized information to be delivered from a radar antenna to a display indicator; and FIG. 3 is a circuit diagram of a system including a plurality of such arrays for the storage of pulses occurring at a rate greater than the scanning speed of the memory device.

In FIG. 1 there has been shown a planar array of ferrite cores 50, having a substantially rectangular hysteresis loop, disposed at the junctions of two orthogonal sets of input conductors 2, 2'; all the cores 50 are traversed by a common output lead 1 extending diagonally across the array.

A timing circuit associated with the array of cores 50 comprises a generator 3 of reading and/or writing signals and a generator 4 of address signals interconnected for synchronous operation. The outputs of generators 3 and 4 are fed to two groups of AND circuits 5 and 6 which, upon coincidence of pulses from the two generators, trigger associated switching-pulse generators 7 and 8 whose output leads are the conductors 2' and 2, respectively.

The output connections of generator 4, shown only diagrammatically, are of such nature that address pulses are consecutively applied to all the combinations of any one "vertical" trigger circuit 5 with any one "horizontal" trigger circuit 6, as is well known per se, thus resulting in the successive analyzing or scanning of all the cores 50 of the array.

As the signals delivered to AND circuits 5 and 6 by the generator 4 consists of pairs of successive current impulses of opposite polarity, which respectively coact with coincident reading or writing pulses in the manner explained above, the switching pulses produced by the generators 7, 8 will be either of a type adapted to inscribe a writing pulse on a selected core 50 or of a type adapted to erase such pulse, depending on the nature of the signal produced by the generator 3. These two generators are, accordingly, representative of various circuits, described in conjunction with the succeeding figures and indicated schematically therein, for delivering address or switching pulses in combination with reading and/or writing pulses to an array of ferromagnetic cores.

Reference will now be made to FIG. 2 for a description of a system incorporating a plurality of arrays of the type shown in FIG. 1, the arrays having been respectively designated 16, 16′, 16″ . . . 16ⁿ. The total number *n* of all the arrays, which are disposed in respective planes, is determined by the number of incremental values of a coordinate (e.g., height of the target) which forms part of the information delivered from a radar station (not shown), via an input lead 14, to a quantizing circuit 15. Thus, the signals on input lead 14 may include a voltage of varying magnitude, derived from an analog computer and representing the height of a target scanned by the radar antenna, as well as echo pulses whose time position within a repetition period of the radar pulses indicates the range of the target. Circuit 15, in response to the voltage level on lead 14, selectively directs the incoming pulses onto outgoing conductors 17, 17′, 17″ . . . 17ⁿ leading to the analogously designated arrays 16, 16′, etc.

As the circuit elements associated with each array 16, 16′, etc., are identical, only those pertaining to the array 16 will be described in detail; corresponding elements of the arrays 16′ and 16″ have been designated by the same reference numerals with the addition of a single or double prize, respectively.

Conductor 17 terminates at a shaping circuit 18 which properly phases the incoming pulses, with reference to switching pulses produced by a timing circuit 21, to enable their inscription on selected cores of the array 16 as heretofore described. The writing pulses in the output of circuit 18 are delivered, by way of an OR circuit 19, to an amplifier 20 feeding the array 16. The output lead 51 of the array includes another amplifier 22 and terminates at a gating network 23 constituted by a pair of gates $G_a$, $G_b$ connected in parallel; gate $G_a$ lies in a feedback path 52 from output amplifier 22 to OR circuit 19 whereas gate $G_b$ has its output lead 29 connected to a common conductor 53 terminating at an intensity-control electrode, such as a Wehnels grid, of an indicator tube 28.

The timer 21 consecutively tests all the cores of each memory array 16, 16′, etc., the arrays being analyzed concurrently, in the course of a single scanning cycle, by simultaneous application of switching and reading pulses to all the homologous cores of the several arrays; the term "homologous cores" denotes cores having corresponding "horizontal" and "vertical" positions in the various arrays. The output connections of the timer to the arrays 16, 16′, 16″ have been diagrammatically indicated at 56, 56′ and 56″, respectively. Thus, the appearance of a pulse on lead 17, 17′ or 17″ alters the state of magnetization on only a single core in the respective array served by this particular lead, i.e., the core which at this instance responds to the applied switching pulses.

Normally, the gates $G_a$, $G_a'$, etc., of the circuits 23, 23′, etc., are open while the companion gates $G_b$, $G_b'$, etc., are closed. These gating circuits are under the control of a switchover circuit 25 which is synchronized with the timer 21 by being connected with it to a common input lead 24 to which synchronization pulses are applied by the radar station. A scanning cycle is therefore defined as the interval between two successive synchronization pulses, the circuit 25 responding to these pulses by reversing the condition of the gating circuits 23, 23′, etc., in cyclic succession. To this end the switchover circuit 25 is provided with output leads 26, 26′, 26″ . . . 26ⁿ, the gating pulses successively transmitted over the first three of these leads having been illustrated at P, P′ and P″. These gating pulses are relatively staggered and of such duration that the associated gate $G_b$, $G_b'$, etc., is held open for a respective scanning cycle or pulse-repetition period whereas the companion gate $G_a$ $G_a'$, etc., is closed. In the absence of a pulse P on the lead 26, therefore, gate $G_a$ is open to unblock the feedback path 52 whereas $G_b$ is closed to block the transmission circuit to the display indicator constituted by tube 28.

Scanning voltages are applied to indicator 28 by way of two conductors 27 and 57, the latter conductor extending from lead 24 to a sweep circuit 30 so as to trigger it with the aid of the sychronizing pulses from the radar station. This periodic triggering gives rise to a sawtooth voltage controlling the horizontal sweep of the tube whose vertical scan is brought about by a stepped potential on conductor 27. For this purpose, conductor 27 is connected to respective outputs of switchover circuit 25 via resistors 54, 54′, 54″ . . . 54ⁿ and to a reference terminal 55 via a further resistor 54°. Thus, the vertical scanning potential varies progressively in step with the switchover from one of the gates $G_b$, $G_b'$, etc., to the next, the indication appearing on tube 28 having therefore a horizontal position representative of distance and a vertical position representative of height. It will, of course, be apparent that other coordinates or parameters may be similarly displayed.

When the gate $G_b$ is closed and the gate $G_a$ is open, the output pulses appearing on lead 51 do not reach the indicator 28 but are fed back to the array 16 by way of amplifier 20 for immediate reregistration on the same core. When the condition of gating circuit 23 is reversed, the pulses read out on conductor 51 control the indicator but are not registered again.

If the interval needed for testing all the cores of an array in the course of a scanning cycle is less than the repetition period of the synchronizing pulses on lead 24, the remainder of the cycle may be utilized for a variety of other purposes such as, for example, rerecording of the previously stored information for future use or the entry of supplemental information, e.g., data relating to calibration or identification, tracking markers or video mapping signals serving to correlate the detected position of a particular target with that of some other target or reference point. This supplemental information may be registered, if desired, on a second, identical memory device preparatorily to joint utilization of the data from all the cores of both devices.

The system described also enables the information relating to one or more targets to be spread over several arrays, in the course of a plurality of scanning cycles, followed by the scanning of the homologous cores at a reduced rate and the transmission of the collected information to an indicator over a channel of relatively narrow bandwidth.

FIG. 3 illustrates the utilization of a system according to the invention in the transmission of radar pulses, arriving over an input lead 31, to a utilization circuit (not shown), connected to an output lead 58, through the intermediary of a memory device 60 which serves for the temporary storage of the pulse data, this device being scannable at a rate which is less than the maximum recurrance rate of the radar pulses. Device 60 is a matrix composed of four like arrays 36, 37, 38, 39 of pulse-storing units similar to the ferromagnetic-core arrays previously described, homologous cores of the four arrays being again simultaneously switchable by address and reading signals from a pair of switching-pulse generators 34 (vertical) and 34' (horizontal), under the control of a timing circuit 32, in the manner explained hereinbefore with reference to the circuits 3–8 of FIG. 1.

The timing pulses from circuit 32 are also applied to a progressive-switching circuit 33 which controls four gates $G_1$, $G_2$, $G_3$, $G_4$ in conductors $49_1$, $49_2$, $49_3$, $49_4$ that are connected between input lead 31 and the respective arrays 39, 38, 37, 36 by way of individual amplifiers 35. Gates $G_1$, $G_2$ and $G_3$ are also in series with respective delay networks $D_1$, $D_2$ and $D_3$. Circuit 33 switches the gates $G_1$–$G_4$ in cyclic succession during each test interval established by the timing pulses from circuit 32, a test interval being the time required for the switching of any one core of array 39 (simultaneously with homologous cores on the other arrays) and being therefore equal to a fraction of a scanning cycle as heretofore defined. It is assumed that the pulses on line 31 are so short and may follow one another so rapidly that several of them (up to four in the example under consideration) will be received within a test interval. Switching circuit 33, by successively opening and closing the gates $G_1$–$G_4$, causes a progressively longer delay of the pulses arriving in the first, second and third quarters of a test interval by making them pass through the staggered delay networks $D_1$, $D_2$ and $D_3$, respectively, so that a train of four consecutive input pulses, received in a single test interval, will be impressed simultaneously upon the arrays 36–39 for recording on homologous cores thereof. Subsequently, upon simultaneous application of the next reading pulses to the four cores involved, these pulses are read out on respective output leads $59_1$, $59_2$, $59_3$, $59_4$, which include individual amplifiers 40 and, except for the lead $59_1$, staggered delay networks $D_2'$, $D_3'$, and $D_4'$ that are complementary to the delay networks $D_1$, $D_2$, $D_3$ so that the overall delay time is the same in all four channels $49_1$–$59_1$, $49_2$—$59_2$, $49_3$–$59_3$ and $49_4$–$59_4$ whereby the output pulses on conductors $59_1$–$59_4$, multipled to lead 58 through a common OR circuit 41, reach that lead in their original time sequence.

It will be understood that the number of arrays in the matrix 60 may be different from that illustrated, depending upon the requirements of the system.

I claim:

1. In a radar system, in combination, input means for supplying radar signals including information on the range and another coordinate of a target; a display indicator; a memory device comprising a matrix of several like arrays of pulse-storage units, each of said arrays having assigned to it a different value of said other coordinate of a target, the position of a unit in its array representing the range of a target; distributor means connected to said input means for producing writing pulses in response to said signals and applying each writing pulse to the array assigned to the value of said coordinate represented by the corresponding radar signal; timer means for testing homologous units of all said arrays in unison in a succession of scanning cycles for inscribing said writing pulses thereon at the instants of their occurrence, said instants being representative of said range, and producing an output signal in response to each inscribed pulse; and circuit means for sequentially applying the output signals from respective arrays to said indicator and translating the time of occurrence of each output signal together with the position of the respective array within said matrix into a two-dimensional display of the position of a target.

2. The combination defined in claim 1 wherein each of said units comprises a ferromagnetic core adapted to have its state of magnetization altered by the application of a writing pulse thereto; said timer means including a generator of switching and reading pulses for testing and restoring the state of magnetization of the cores of successively scanned groups of homologous units and conditioning said cores for the inscription of writing pulses; said arrays being individually provided with output connections leading to said indicator, feedback connections for re-registering an inscribed writing pulse, and gate means in said connections controlled by said delay means for alternately unblocking said output connections and said feedback connections; said circuit means being synchronized with said timer means for so operating said gate means as to maintain each array connected to said indicator during a respective scanning cycle and enabling re-registration of inscribed pulses on its cores during all other scanning cycles.

3. In a radar system, in combination, a memory device comprising a matrix of several like arrays of pulse-storing units each having assigned to it a different value of information relating to the position of the target; timer means for testing homologous units of all said arrays in unison in a succession of scanning cycles and at a predetermined scanning speed for producing output pulses during respective test intervals in response to pulses stored thereon, said arrays being provided with a common output circuit; a source of radar-controlled writing pulses having a maxmium recurrence rate greater than said scanning speed whereby several such pulses may occur in a single test interval; distributor means connected between said source and said memory device for directing successive writing pulses within a test interval to homologous units of different arrays in a predetermined order; and staggered delay means connected between said arrays and said output circuit for sequentially delivering thereto the output pulses derived from a plurality of writing pulses stored concurrently on said homologous units.

4. The combination defined in claim 3 wherein each of said units comprises a ferromagnetic core adapted to have its state of magnetization altered by the application of a writing pulse thereto; said timer means including a generator of switching and reading pulses for testing and restoring the state of magnetization of the cores of successively scanned groups of homologous units and conditioning said cores for the storage of writing pulses; said arrays being individually provided with input connections leading to said source and delay means in said connections complementary to said staggered delay means for applying said successive writing pulses simultaneously ot the homologous cores conditioned for their storage during the test interval in which they occur.

5. In a radar system, in combination, means for supplying radar signals including information on the range and height of a target, an indicator, a memory device comprising arrays of magnetic-core pulse-storage units, the cores of said units having substantially rectangular hysteresis loops, said arrays being arranged each in a different plane representing a particular height of a target, the position of a core in its plane representing the range of a target, distributor means responsive to said radar information for producing pulses and supplying each pulse to the memory plane representing the height information of said pulse, address circuit means for switching the cores in each plane sequentially with all homologous cores being switched in unison for writing said pulses, and means for reading out the stored pulses in said memory planes sequentially and supplying the readout pulses to said indicator.

6. The combination defined in claim 5 wherein said distributor means includes means for quantizing said radar information and a plurality of channels for selectively receiving the quantized information.

7. The combination defined in claim 5, further including means for producing a sweep along one dimension of said indicator at the rate at which a memory plane is scanned and a sweep along another dimension of the indicator at a rate at which the several planes are scanned.

8. In radar apparatus, in combination, a memory device comprising magnetic cores having substantially rectangular hysteresis loops arranged in a given order in a plurality of like arrays so that each core represents a predetermined value of a target co-ordinate, means for supplying successive radar bits of information at a predetermined rate the cores of different arrays representing the values of said information, a source of read-out pulses for switching the cores of each array to make them receptive to new bits of information, said bits of information occurring at a frequency greater than the cadence of said pulses, means for analyzing homologous cores in the several arrays at a predetermined speed, and means for delivering from the memory device the recorded bits of information sequentially at the same rate as that of the occurrence of said successive bits.

9. The combination defined in claim 8 wherein said cores are arranged in a plurality of planes.

References Cited

FOREIGN PATENTS 894,148 1962 Great Britain.

RODNEY D. BENNETT, Primary Examiner

M. F. HUBLER, Assistant Examiner

U.S. Cl. X.R.

343—9, 11